US012372037B2

(12) United States Patent
Smith

(10) Patent No.: US 12,372,037 B2
(45) Date of Patent: Jul. 29, 2025

(54) HYDROGEN FUEL PRESSURE ENERGY RECOVERY FOR HYDROGEN ENGINE VEHICLES

(71) Applicant: Southwest Research Institute, San Antonio, TX (US)

(72) Inventor: Edward M. Smith, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 18/354,340

(22) Filed: Jul. 18, 2025

(65) Prior Publication Data

US 2025/0027457 A1 Jan. 23, 2025

(51) Int. Cl.

| | |
|---|---|
| ***F02D 19/02*** | (2006.01) |
| ***F02M 21/02*** | (2006.01) |
| ***F02M 59/02*** | (2006.01) |
| ***F02M 59/12*** | (2006.01) |

(52) U.S. Cl.

CPC ......... *F02D 19/023* (2013.01); *F02D 19/027* (2013.01); *F02M 21/0209* (2013.01); *F02M 21/0221* (2013.01); *F02M 21/0239* (2013.01); *F02M 21/0245* (2013.01); *F02M 59/025* (2013.01); *F02M 59/12* (2013.01); *F02D 2200/0602* (2013.01); *F02D 2200/0606* (2013.01)

(58) Field of Classification Search

CPC . F02D 19/023; F02D 19/027; F02M 21/0209; F02M 21/0221; F02M 21/0239; F02M 21/0245; F02M 59/025; F02M 59/12

USPC .......................................................... 123/294

See application file for complete search history.

(56) References Cited

U.S. PATENT DOCUMENTS

| | | | |
|---|---|---|---|
| 2014/0373531 A1 | 12/2014 | Wong | |
| 2021/0301775 A1 | 9/2021 | Puran et al. | |
| 2021/0372350 A1 | 12/2021 | Seba et al. | |

FOREIGN PATENT DOCUMENTS

| | | | |
|---|---|---|---|
| CN | 104285060 A * | 1/2015 | ............. F01B 21/00 |

* cited by examiner

*Primary Examiner* — Lindsay M Low
*Assistant Examiner* — Omar Morales
(74) *Attorney, Agent, or Firm* — Livingston Law Firm

(57) ABSTRACT

A fuel system for a hydrogen-fueled internal combustion engine vehicle. A compressor/expander is installed in fluid connection between the fuel tank and the engine's fuel delivery system. The compressor/expander operates in compressor mode when the hydrogen fuel in the fuel tank is below a pressure desired for fuel delivery. It operates in expander mode when the hydrogen fuel in the fuel tank is above the desired pressure. The compressor/expander has inlet and outlet metering valves. A controller receives fuel tank pressure and temperature measurements and calculates timing of the metering valves to maintain the desired pressure into the fuel delivery system.

17 Claims, 4 Drawing Sheets

HYDROGEN FUEL PRESSURE ENERGY RECOVERY FOR HYDROGEN ENGINE VEHICLES

BACKGROUND OF THE INVENTION

A hydrogen-fueled internal combustion engine vehicle uses an internal combustion engine with hydrogen as fuel, and is to be distinguished from hydrogen fuel cell vehicles that use hydrogen electrochemically rather than combustion. The absence of carbon in hydrogen fuel means that no carbon dioxide is produced during combustion, which eliminates the main greenhouse gas emission of conventional petroleum engines. As used herein "hydrogen-fueled engine" refers to a hydrogen-fueled internal combustion engine, whether fueled entirely with hydrogen or using multi-mode fuels.

One challenge for vehicles with hydrogen-fueled engines is on-board fuel storage. A hydrogen-fueled vehicle can store its hydrogen as either a gas or a liquid. Gas storage is typically the method used, with high-pressure tanks of 350-700 bar (5,000-10,000 psi) tank pressure. Hydrogen-fueled vehicles require the fuel to be stored at high pressure to store enough fuel mass in a reasonable tank volume to have acceptable fuel range. 700 bar is a commonly discussed maximum pressure for hydrogen fuel storage on board a vehicle.

As fuel is consumed by the vehicle, fuel pressure in the fuel tank will decrease down to some minimum value. At this fuel level, a fuel tank is considered functionally empty and will have to be refueled.

Depending on how the hydrogen fuel is introduced into the engine, the minimum pressure required for fuel delivery can vary. Fuel delivery by port fuel injection may operate at a relatively low fuel pressure, 20 bar for example. Direct injection systems, which introduce the fuel directly into the cylinder for increased engine efficiency and performance, may require higher pressure, especially if the fuel is to be injected at or near top-dead-center firing, 300 bar for example. If the minimum fuel tank pressure is required to be 300 bar instead of 20 bar to supply fuel to the injectors at the required pressure, the usable amount of fuel stored in 700 bar fuel tanks is reduced by approximately half.

DETAILED DESCRIPTION OF THE INVENTION

Figure 1:
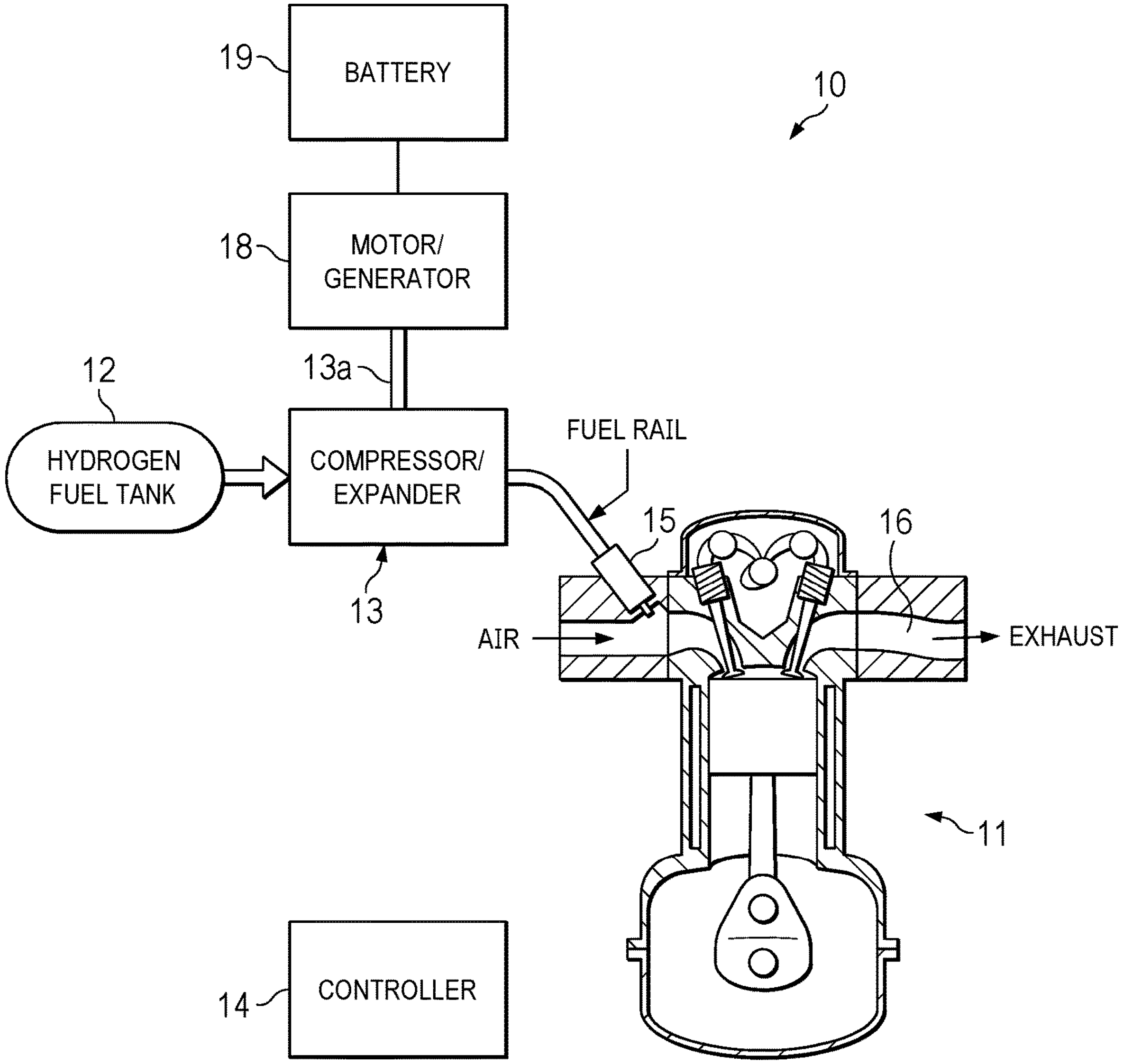
FIG. 1 is a representative illustration of a fuel system for a hydrogen-fueled vehicle in accordance with the invention.

FIG. 1 is a representative illustration of a hydrogen-fueled vehicle 10 in accordance with the invention. The engine 11 is represented as a single cylinder, and it should be understood that engine 11 will most likely have additional cylinders. Various engine components known in the art of internal combustion engines and not relevant to the invention are not shown.

In the embodiment of FIG. 1, the cylinder(s) receive fuel via a fuel rail, but other configurations are possible. Fuel delivery into the cylinders is assumed to be by high pressure delivery, such as by direct injection. The engine's fuel delivery system has a desired injection pressure, referred to herein as the "desired fuel delivery pressure".

Hydrogen fuel is stored as a gas in hydrogen tank 12. As indicated in the Background, the engine's fuel delivery system may have a desired fuel delivery pressure that varies from the storage pressure in tank 12.

In the example of FIG. 1, cylinder 11 has one input fuel injector 15, which receives pressurized hydrogen fuel to be burned and exhausted by cylinder 11. Injector 15 is electronically controlled and capable of opening and closing many times per second. When the injector 15 is energized, it mechanically opens the cylinder's inlet valve, allowing pressurized fuel to enter the cylinder. Cylinder 11 also has one exhaust valve 16 that emits engine exhaust. In other embodiments, each cylinder 11 may have more than one inlet valve and/or more than one exhaust valve.

Because hydrogen fuel is gaseous and low density, the amount of energy required to deliver fuel from low pressure storage in tank 12 to high pressure injection is high compared to traditional liquid fuels. For example, an engine that nominally operates at 42 percent brake thermal efficiency would suffer a fuel economy penalty of greater than 7 percent if it needed to compress hydrogen fuel from a nearly-depleted fuel tank at 20 bar up to a required fuel delivery pressure of 300 bar. Conversely, if the fuel pressure from a nearly full tank of 700 bar is reduced to the delivery pressure of 300 bar through a conventional regulator, expansion energy is lost to irreversible throttling losses.

A feature of the invention is the use of compressor/expander 13 to receive hydrogen from fuel tank 12 and to deliver hydrogen to injector(s) 15 (via a fuel rail) at the desired injection pressure. Compressor/expander 13 is installed in fluid communication with and between the fuel tank 12 and the engine's fuel delivery system (typically a fuel rail).

Compressor/expander 13 operates in either of two modes: compression mode or expansion mode. It operates as a compressor if the fuel tank pressure is below the desired fuel delivery pressure. It operates as an expander if the fuel tank pressure is higher than the desired fuel delivery pressure. As explained below, the mode in which compressor/expander operates is controlled by metering valves at the inlet(s) and outlet(s) of the cylinder(s).

Compressor/expander 13 may be implemented with various positive displacement devices. In the embodiment of this description, compressor/expander 13 is implemented with a piston-type device. Other positive displacement devices could be used, rotary or piston type. In general, any device that cyclically increases and decreases its internal volume and is controlled by valves could be used. "Controlled by valves" means that inlet and outlet flow are controlled by valves rather than covering and uncovering ports.

Expansion work is captured by compressor/expander 13 when it is operating in expansion mode. The recovered energy from the fuel tank pressure during the time the tank is nearly full can offset fuel economy penalties during the time the tank is nearly empty. In the example of FIG. 1, compressor/expander 13 is driven by a motor/generator 18. When the compressor/expander 13 operates in expander mode, motor/generator 18 recovers energy. This recovered energy may be delivered to the engine's electrical devices and/or stored in a battery 19. Alternatives for driving compressor/expander 13 with the engine crankshaft and for recovering energy as engine torque are discussed in connection with FIG. 4.

Figure 2:
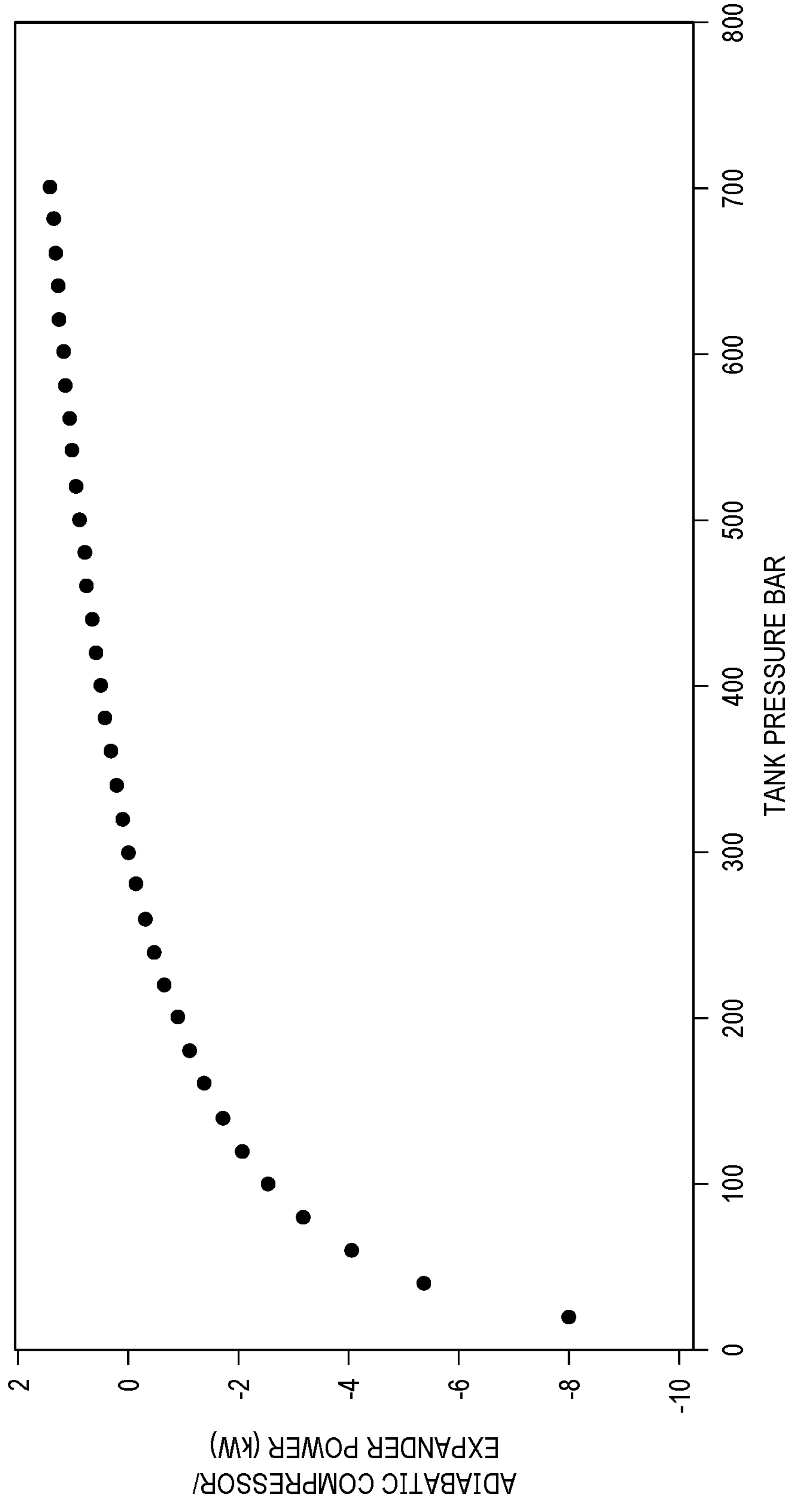
FIG. 2 illustrates the advantages of the compressor/expander of FIG. 1.

FIG. 2 illustrates the advantages of compressor/expander 13. This example illustrates adiabatic power of a compressor/expander 13 as a function of tank pressure, assuming a 42 percent BTE (brake thermal energy) vehicle operating at 120 kW. If compressor/expander 13 is used for a fuel tank with a maximum pressure of 700 bar that needs to deliver fuel to the engine at 300 bar, the fuel economy penalty for pumping fuel at low tank pressures would be completely offset by the fuel economy benefits of expanding the fuel at high tank pressures on a tank mileage basis down to 128 bar (300×3/7).

Further range could be gained by pumping from even lower pressures, assuming sufficient pump displacement and drive power, at a tank fuel economy penalty significantly reduced compared to the pump-only case. The lower the required fuel delivery pressure the lower the tank mileage breakeven fuel tank pressure. If only 120 bar fuel delivery pressure is required, then the tank mileage breakeven fuel tank pressure is 20 bar for a 700-bar-rated fuel tank.

Figure 3:
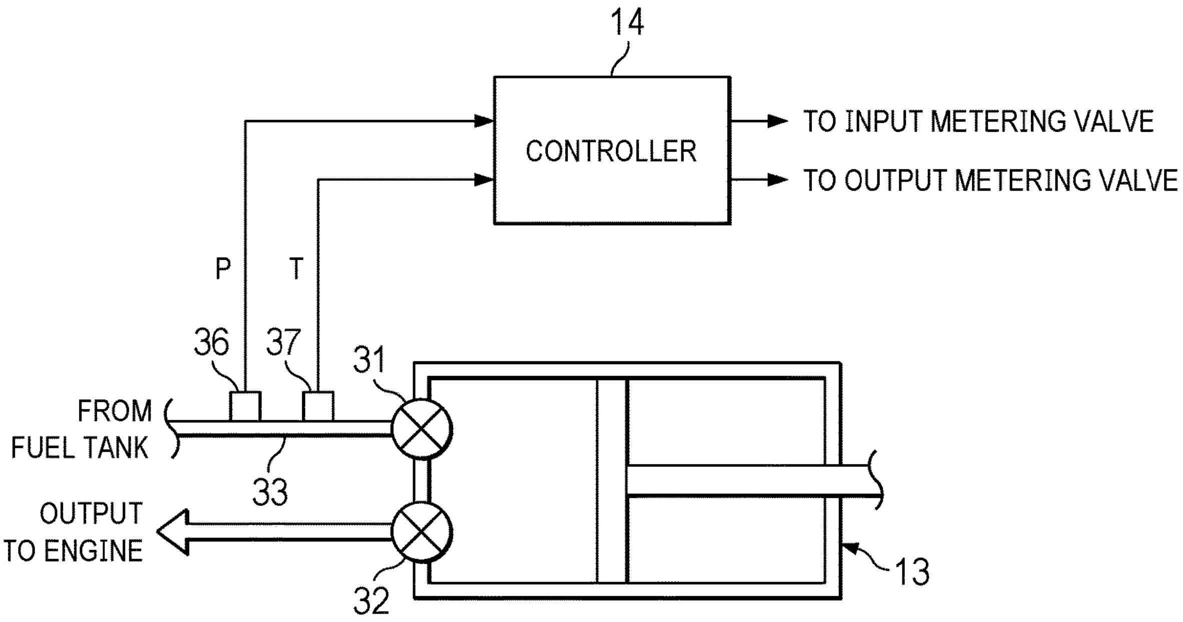
FIG. 3 illustrates the compressor/expander and its control system.

FIG. 3 illustrates compressor/expander 13 and its control system. In the embodiment of FIG. 3, compressor/expander 13 is represented as a single-cylinder piston-type positive displacement device. However, as explained above, other embodiments are possible.

The inlet and outlet (exhaust) valves of the compressor/expander's cylinder are actively controlled inlet and outlet metering valves 31 and 32, respectively. In other embodiments, compressor/expander 13 may have more than one cylinder. It may have more than one inlet and/or more than one outlet valve per cylinder. In general terms, compressor/expander 13 will have at least one metered inlet valve and one metered outlet valve per cylinder.

Inlet metering valve 31 connects the fuel tank 12 to the cylinder of compressor/expander 13. Outlet metering valve 32 connects the cylinder to the engine's fuel delivery system, such as its fuel rail.

Controller 14 receives measured fuel input pressure and temperature from sensors 36 and 37, respectively. Controller 14 also stores desired injection pressure and fuel flow. From this data, controller 14 determines whether compressor/expander 13 will operate in compressor mode or expander mode. It ensures that the fuel delivered to the engine's injector(s) is maintained at the desired pressure at the point of delivery. Typically, this delivery will be via an engine fuel rail. Controller 14 further calculates the opening and closing timing for valves 31 and 32 to maintain the desired fuel flow.

More specifically, during the piston travel, controller 14 controls the timing of the inlet and outlet metering valve opening and duration to minimize pressure drop and thus throttling losses across valves 31 and 32 during the filling and discharge strokes. The metering valves are controlled to control the fuel input and output to ensure that the engine is only fed the amount of fuel required at the desired pressure.

Figure 4:
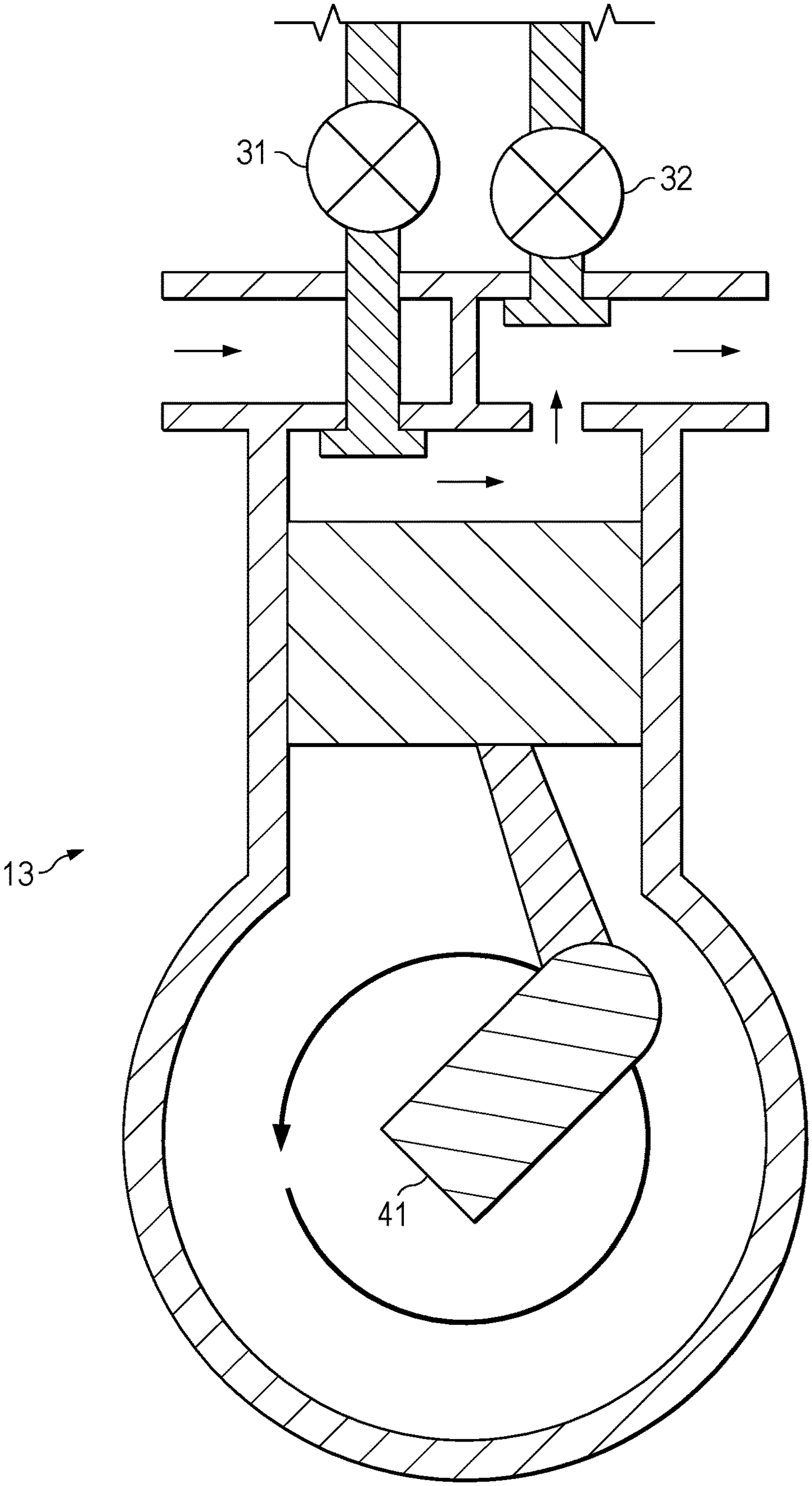
FIG. 4 illustrates compressor/expander driven by the engine crankshaft instead of by a motor.

FIG. 4 illustrates compressor/expander 13 driven by the engine crankshaft 41 in a manner similar to how conventional high-pressure fuel pumps are driven. The connection to the crankshaft 41 is shown as a direct connection but would in practice be by gears, chains, belts, or the like. Recovered energy during the expansion mode may be realized as additional torque available from the engine.

The invention claimed is:

1. A fuel system for a vehicle comprising:

a fuel tank for storing hydrogen gas fuel;

an internal combustion engine, the internal combustion engine having a fuel delivery system for injecting the hydrogen fuel into at least one combustion cylinder;

a compressor/expander in fluid connection between the fuel tank and the engine's fuel delivery system, the compressor/expander configured to: receive the hydrogen gas fuel from the fuel tank, deliver the hydrogen gas fuel at a desired fuel pressure to the fuel delivery system, operate in compressor mode when the hydrogen gas fuel in the fuel tank is below the desired pressure, and operate in expander mode when the hydrogen gas fuel in the fuel tank is above the desired pressure;

wherein the compressor/expander operates upon the hydrogen gas fuel in gas form without introduction of any liquid;

a fuel tank pressure sensor for measuring the pressure of the hydrogen gas fuel at the outlet of the fuel tank;

a fuel tank temperature sensor for measuring the temperature of the hydrogen gas fuel at the outlet of the fuel tank;

an inlet metering valve at the inlet to the compressor/expander for metering flow timing and amount from the fuel tank to the compressor/expander;

an outlet metering valve at the outlet from the compressor/expander for metering flow timing and amount from the compressor/expander to the fuel delivery system;

a controller for receiving pressure and temperature measurements from the pressure sensor and from the temperature sensor, for storing data representing the desired pressure, and for calculating timing of the opening and closing of the inlet metering valve and the outlet metering valve to maintain the desired pressure at a delivery point to the fuel delivery system.

2. The fuel system of claim 1, wherein the vehicle uses exclusively hydrogen gas fuel.

3. The fuel system of claim 1, wherein the vehicle uses hydrogen gas fuel in at least one operating mode.

4. The fuel system of claim 1, wherein the compressor/expander is a piston-type compressor/expander.

5. The fuel system of claim 1, wherein the compressor/expander is a rotary-type compressor/expander.

6. The fuel system of claim 1, wherein the compressor/expander is driven by a motor.

7. The fuel system of claim 6, wherein the compressor/expander returns energy to the motor.

8. The fuel system of claim 1, wherein the compressor/expander is driven by a crankshaft of the internal combustion engine.

9. A method of delivering hydrogen gas fuel to a vehicle having a fuel tank for storing the hydrogen gas fuel and an internal combustion engine, the internal combustion engine having a fuel delivery system for injecting the hydrogen gas fuel into at least one combustion cylinder at a desired pressure, comprising:

delivering the hydrogen gas fuel from the fuel tank to a compressor/expander, the compressor/expander having an inlet metering valve at the inlet to the compressor/expander for metering flow timing and amount from the fuel tank to the compressor/expander, and having an outlet metering valve at the outlet from the compressor/expander for metering flow timing and amount from the compressor/expander to the fuel delivery system;

measuring the pressure of the hydrogen gas fuel at the outlet of the fuel tank;

measuring the temperature of the hydrogen gas fuel at the outlet of the fuel tank;

operating the compressor/expander in compressor mode when the hydrogen gas fuel in the fuel tank is below the desired pressure;

operating the compressor/expander in expander mode when the hydrogen gas fuel in the fuel tank is above the desired pressure;

wherein the compressor/expander operates upon the hydrogen fuel in gas form without introduction of any liquid; and calculating timing of the opening and closing of the inlet metering valve and the outlet metering valve to maintain the desired pressure at a delivery point to the fuel delivery system.

10. The method of claim 9, wherein the vehicle uses exclusively hydrogen gas fuel.

11. The method of claim 9, wherein the vehicle uses hydrogen gas fuel in at least one operating mode.

12. The method of claim 9, wherein the compressor/expander is a piston-type compressor/expander.

13. The method of claim 9, wherein the compressor/expander is a rotary-type compressor/expander.

14. The method of claim 9, wherein the compressor/expander is driven by a motor.

15. The method of claim 14, further comprising returning energy to the motor during the expansion mode.

16. The method of claim 9, wherein the compressor/expander is driven by a crankshaft of the internal combustion engine.

17. The method of claim 16, further comprising returning energy to the engine during the expansion mode.

* * * * *